March 13, 1962 R. A. SANDLER 3,025,041
VAPOR LIQUID CONTACTING DEVICES
Filed Aug. 21, 1958 2 Sheets-Sheet 1
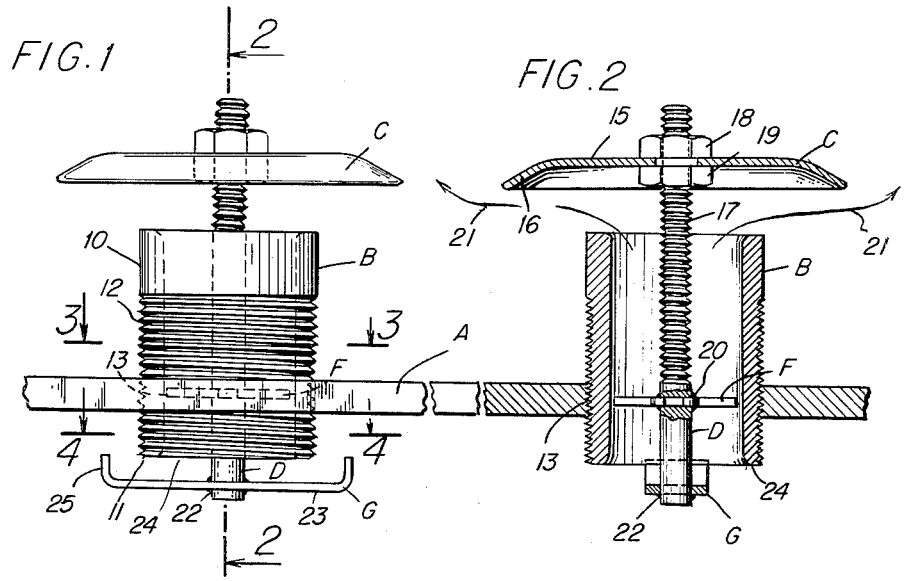
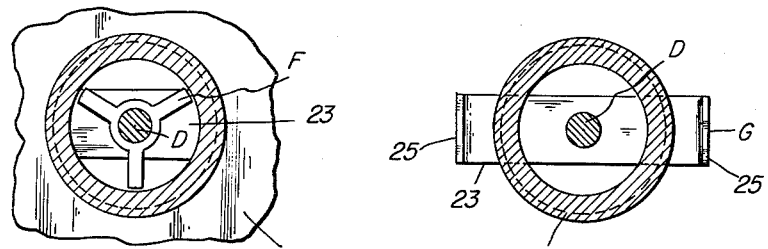
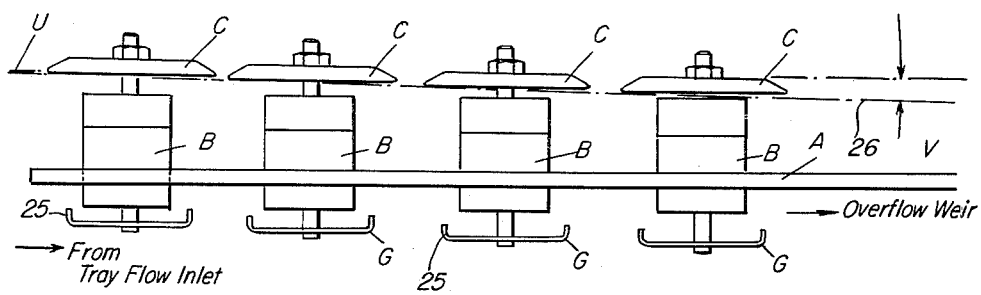
INVENTOR.
Robert A. Sandler
BY
Attorney

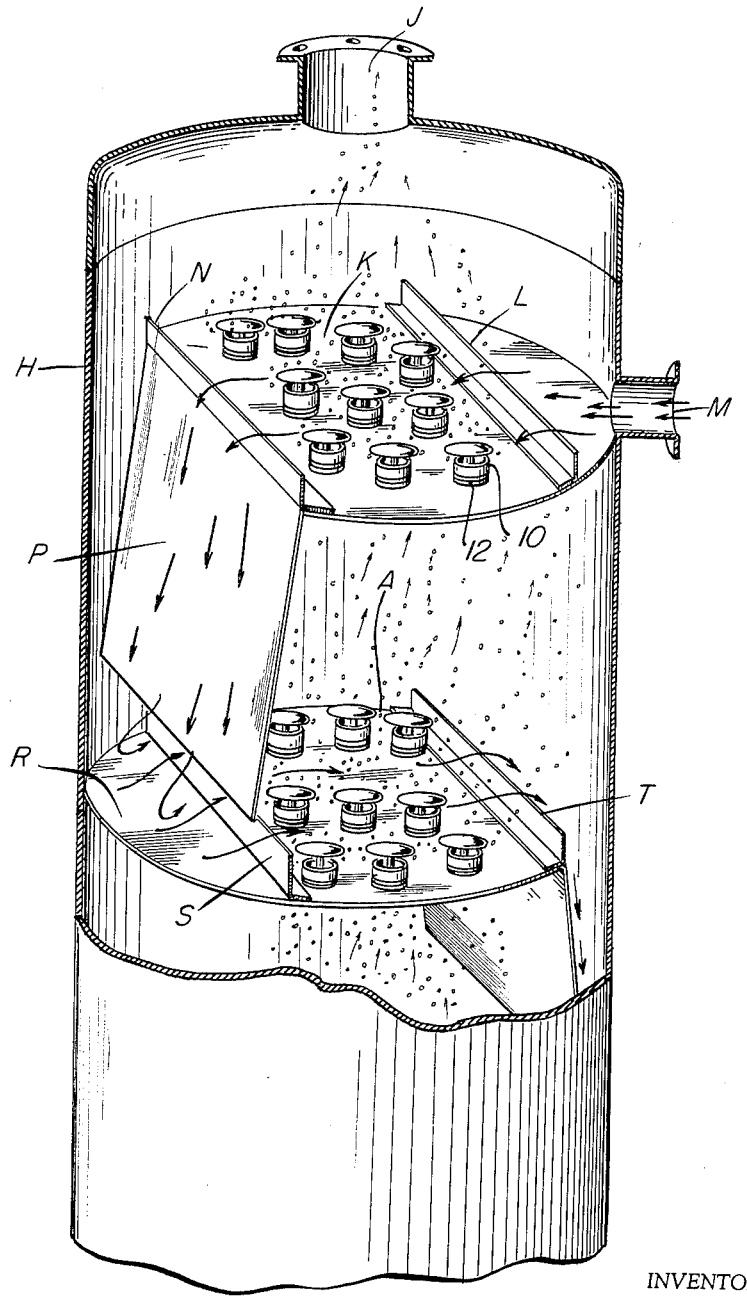

United States Patent Office 3,025,041
Patented Mar. 13, 1962

3,025,041
VAPOR LIQUID CONTACTING DEVICES
Robert A. Sandler, Colonia, N.J., assignor to Continental Copper & Steel Industries, Inc., New York, N.Y., a corporation of Delaware
Filed Aug. 21, 1958, Ser. No. 756,348
1 Claim. (Cl. 261—114)

The present invention relates to a vapor liquid contacting device and it particularly relates to such a device of the type known as a bubble tower.

Although the present invention is not limited thereto, it will be particularly described in its application to novel liquid vapor contacting devices of the bubble cap type in which there is an intimate contact of an ascending vapor and a descending liquid, with the vapor passing upwardly through a series of covered openings in trays and with the liquid flowing downwardly in succession over each tray and from side to side thereof.

In constructing the vapor liquid contacting devices of the bubble tower type, the caps are usually positioned upon the trays over which the liquid flows downwardly therefrom in fixed position. When the various components, including the column trays and the bubble caps, are once assembled together, their relative positions will be fixed and there will be no variable in the operation of the unit, even with widely varying flows of vapor and with varying levels of liquid upon the trays.

It is among the objects of the present invention to provide a novel vapor liquid contacting device of the character described, in which the system will be subjected to automatic adjustment and variation, depending upon the relative vapor and liquid volume, to assure a more uniform contact and processing as between the vapor and liquid, and so as to assure the most effective operation of the bubble caps in respect to the liquid flowing downwardly upon the trays.

Another object of the present invention will be to provide a bubble tower in which the bubble caps are so arranged that they will be at a fixed or constant level above the level of liquid upon the trays, adjusting themselves to the level of liquid and to assure that there will be a substantially uniform contact of the vapors in respect to the liquid and a substantially uniform head of liquid as opposing the flow of the vapor upwardly through the bubble cap, with the result that there will be more uniform flow of the liquid over the entire area of the tray and through the distributed bubble caps without some bubble caps receiving an excess flow of vapor and others being substantially blocked by an excess head of liquid upon the tray.

A further object of the present invention is to provide a vapor liquid contacting system particularly designed for bubble towers, in which there will be uniform processing of the vapor and contact of vapor and liquid over the entire area of the tray, whether close to or far away from the overflow weir and without regard to the liquid gradient upon each tray.

A still further object of the present invention is to provide a novel uniform tower system in which the bubble caps will always be substantially uniformly submerged, with uniform vapor passage therethrough, whether the liquid be relatively deep upon the tray or relatively shallow, and regardless of the relative position of the particular bubble cap in respect to inlet of fluid to the tray or its proximity in respect to the overflow weir at the outlet of each tray.

Still another object of the present invention is to provide a bubble cap tower design in which the bubble caps will operate effectively over a relatively wide range of vapor flow rates without excessive pressure drop through the bubble cap assembly and with the vapor-liquid contact being equally effective, regardless of whether there be a more rapid flow of liquid or a less rapid flow of liquid, with greatly enhanced efficiency of the distillation and efficiency of liquid-vapor contact.

Still further objects and advantages will appear in the more detailed description set forth below, it being understood, however, that this more detailed description is given by way of limitation, since various changes therein may be made by those skilled in the art without departing from the scope and spirit of the present invention.

In accomplishing the above objects it has been found most suitable, according to one embodiment of the present invention, to provide a novel bubble cap arrangement for a bubble tower in which the bubble caps will substantially automatically adjust themselves to assure a constant head and uniform liquid vapor contact.

In such a construction, the bubble cap will automatically elevate itself or lower itself so as to float vertically to give a variable orifice area and to arrange itself so that the liquid head will be substantially constant over the area of the plate, regardless of the liquid gradient and regardless of the rate of flow of the liquid.

In the preferred form, the bubble cap arrangement is devoid of slots and serrations and has a sufficient amount of vertical play so that the cap will always have the same level in respect to the liquid level.

In this preferred construction, the pressure drop is a function of the mass of the bubble cap assembly, and each bubble cap functions substantially the same, irrespective of its location on the tray in respect to the inlet or overflow weir and in respect to the depth of level of the particular portion of the tray where the bubble cap is positioned.

The bubble caps of the present invention are particularly effective in eliminating a complete inverted cuplike enclosure with slotted side cup portions and with fixed adjustments which cannot be changed once the bubble tower has been assembled and is being utilized.

The present invention particularly avoids open or closed inverted cup arrangements with bolt, stud or wedge hold-downs, and also avoids quarter turn cap constructions which involve substantial expense and which prevent effective adjustment of the arrangement in varying operating conditions.

Furthermore, a most important feature of the present invention resides in the fact that once the column trays and bubble caps are assembled there will be an automatic adjustment throughout the operation to assure uniformity in the vapor-liquid contact throughout the area of each tray and to give greatly increased efficiency of the vapor-liquid contact and of the distillation.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 1 is a side elevational view of an automatically adjustable variable bubble cap arrangement, according to the present invention.

FIG. 2 is a transverse vertical sectional view upon the line 2—2 of FIG. 1.

FIG. 3 is a transverse horizontal sectional view upon the line 3—3 of FIG. 1.

FIG. 4 is a transverse horizontal sectional view upon the line 4—4 of FIG. 1.

FIG. 5 is a diagrammatic side elevational view showing the automatic positioning of the caps to accommodate a liquid gradient from the inlet to the overflow weir of each tray.

FIG. 6 is a diagrammatic view of a part of a tower showing the bubble caps in position thereon.

Referring to FIGS. 1 to 5, there is shown a tray A having the spaced risers B distributed over the area thereof.

The caps C will be relatively shallow without flanges extending over the sides of the risers, and they will have central carrying rods D with intermediate guide members F inside of the risers B and lower contact or limit strips G.

As shown in FIG. 6, there is an upper part of a tower H having the top vapor outlet J with a lower tray A and an upper tray K. The upper tray K has the weir and seal plate L adjacent the liquid inlet M, and it has an overflow weir N with a downcomer P.

The liquid will then flow into the area R on the tray A and then over the inlet baffle S. From the right hand side of the tray A the liquid will overflow the weir T.

As shown in FIG. 5, normally there will be a gradient indicated by the dot and dash lines coming together at U and separating as indicated at V respectively at the left and right of the tray. Normally, the level at U adjacent the inlet would be higher than the level at V adjacent the overflow weir, with the result that the caps to the left would have a greater head of liquid than the caps to the right.

Under these conditions the vapor would preferentially flow through the caps having the lower liquid level adjacent the overflow weir, and would tend to avoid the caps adjacent the inlet where the head is greater.

In the arrangement shown in FIG. 5 in small scale and in FIGS. 1 to 4 in large scale, each cap will seek its own level to maintain a constant liquid head.

In the installation indicated at FIGS. 1 and 2, each riser B has an upper portion 10 and a lower portion 11 with a lower threaded portion 12 being threaded through the tapped opening 13 in the tray. Instead of a threaded connection, as indicated at 12—13, it is possible that the risers may be welded or expanded into position in the opening in each tray.

The cap C itself in one modification will have a flat portion 15 with the down turned edge 16 and it will be devoid of a deep flange which normally would project downwardly and outside of the risers B. The central rod D is shown as threaded, as indicated at 17, and held in position by the nuts 18 and 19, but it too might be welded at its upper end to the cap C.

Intermediate of the rod F are one or more spiders F which are held in position by welding or brazing at 20. The guide members F will serve to guide the cap C in its upward and downward movement, with the tendency of the vapor escaping, as indicated by the arrows 21 in FIG. 2, maintaining the cap C in level position.

The lower end of the cap carries the U-shaped stop or limit strip G which is held in position by welding or brazing at 22.

The strip G has the horizontal transverse portion 23 which acts as a stop against the lower ends 24 of the riser B, and it has the upstanding end portions 25.

As indicated in FIG. 5, in operation with the liquid level at the lower dotted line 26, each cap C will assume a constant level position in respect to such liquid level.

The pressure of the vapors passing upwardly through the risers B will cause a floating of the cap.

Each of the caps will float at a uniform position in respect to the liquid level, so that all of the risers will receive the same upward flow of vapor and so that there will be a minimum pressure drop and a uniform vapor liquid contact over the entire area of each tray.

Although the preferred cap C has an inverted dished shape, it could also have a flat shape without the down turned edge portion 16. When there is no liquid flowing and when the vapor is not forcing the caps up, the cap C will be resting on the top edge of the risers B. At maximum elevation the U-shaped strips G will contact the lower edge 24 of the risers B.

The present invention avoids the use of fixed bubble cap designs with vertical tubes and risers discharging into an inverted cup with slotted or serrated side walls, and the vapor flow will not be affected by the liquid gradient upon each tray from the outlet side to the overflow side.

As a result, the present bubble cap design will pass the same amount of vapor, whether it be adjacent the inlet and more deeply submerged or adjacent the overflow weir and less deeply submerged, and there will be approximately the same depth or head of liquid over the caps at both the inlet and outlet side of the tray.

The tray of the present application is particularly effective in its ability to operate over a wide range of vapor rates.

At high vapor rates the pressure drop through the bubble assembly will not be excessive, and even at low vapor rates assurance will be had that a proper contact of vapor and liquid be maintained, with gradually increased efficiency of vapor-liquid contact and efficiency of distillation.

Floating each bubble cap will assure a variable orifice area, irrespective of its location on the tray and irrespective of the depth of its submersion in the liquid.

Since there are no narrow slots or serrations in the sides of the cap flanges, there will be decreased resistance to the flow of liquid and vapor and each cap will float vertically because of the vertical play allowed, depending upon the mass of the bubble cap and the upward force of the vapor. The upper disc or cap may slightly float on the liquid, or be slightly submerged.

As many changes could be made in the above vapor-liquid contacting devices, and many widely different embodiments of this invention could be made without departure from the scope of the claim, it is intended that all matter contained in the above description shall be interpreted as illustrative and not in a limiting sense.

Having now particularly described and ascertained the nature of the invention, and in what manner the same is to be performed, what is claimed is:

In a bubble tower of the type having horizontal trays with closely spaced short externally threaded tubular vertical cylindrical risers extending vertically therethrough, said trays having tapped sockets receiving said threaded risers, a floating bubble cap arrangement comprising a shallow flat circular cap above the upper edge of the riser having a slightly downwardly inclined peripheral edge portion beyond the upper edge of the riser, a threaded vertical guide rod extending axially and longitudinally through the respective riser, a spider mounted on said guide rod below the threaded portion thereof for sliding movement within said riser to center said guide rod, a transverse stop below the riser, said cap and stop being respectively connected to said rod at its upper and lower ends, said cap having an adjustable double nut connection to the upper threaded end of said rod and said spider being mounted adjacent the lower end of the guide rod adjacent the stop, said stop consisting of a flat cross bar with upturned ends.

References Cited in the file of this patent

UNITED STATES PATENTS

| | | |
|---|---|---|
| 1,411,374 | Pajalic | Apr. 4, 1922 |
| 1,453,735 | Twining | May 1, 1923 |
| 2,061,830 | Campbell | Nov. 24, 1936 |
| 2,525,064 | Bragg | Oct. 10, 1950 |
| 2,627,397 | Hendrix | Feb. 3, 1953 |
| 2,658,737 | Nutter | Nov. 10, 1953 |
| 2,819,050 | Huggins et al. | Jan. 7, 1958 |